(12) United States Patent
Matsuno et al.

(10) Patent No.: US 8,266,893 B2
(45) Date of Patent: Sep. 18, 2012

(54) EXHAUST GAS PURIFICATION APPARATUS OF INTERNAL COMBUSTION ENGINE

(75) Inventors: Shigehiro Matsuno, Toyota (JP); Jun Tahara, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1113 days.

(21) Appl. No.: 12/092,218

(22) PCT Filed: Oct. 31, 2006

(86) PCT No.: PCT/JP2006/321787
§ 371 (c)(1),
(2), (4) Date: Apr. 30, 2008

(87) PCT Pub. No.: WO2007/052673
PCT Pub. Date: May 10, 2007

(65) Prior Publication Data
US 2009/0288393 A1    Nov. 26, 2009

(30) Foreign Application Priority Data
Nov. 2, 2005 (JP) .................................. 2005-319498

(51) Int. Cl.
*F01N 3/00* (2006.01)
(52) U.S. Cl. ................ 60/286; 60/285; 60/295; 60/297; 60/301; 60/303
(58) Field of Classification Search ............ 60/285, 60/286, 295, 301, 303
See application file for complete search history.

(56) References Cited

U.S. PATENT DOCUMENTS

| | | | | |
|---|---|---|---|---|
| 6,327,849 | B1 * | 12/2001 | Sugiura et al. | 60/277 |
| 6,530,216 | B2 * | 3/2003 | Pott | 60/295 |
| 7,299,625 | B2 * | 11/2007 | Uchida et al. | 60/277 |
| 7,454,900 | B2 * | 11/2008 | Hayashi | 60/295 |
| 2003/0106306 | A1 * | 6/2003 | Nakatani et al. | 60/288 |
| 2003/0145581 | A1 | 8/2003 | Tashiro et al. | |
| 2005/0076635 | A1 | 4/2005 | Suyama et al. | |

FOREIGN PATENT DOCUMENTS
EP     1 515 014 A1     3/2005
(Continued)

*Primary Examiner* — Thomas Denion
*Assistant Examiner* — Diem Tran
(74) *Attorney, Agent, or Firm* — Sughrue Mion, PLLC (57) ABSTRACT

An adding time a of a fuel addition to an exhaust system is limited to a guard value G or less during an adding period A of a concentrated intermittent fuel of a catalyst recovery control. Accordingly, a one-time fuel adding amount from an adding valve 46 is limited to be equal to or less than a predetermined value, and it is possible to prevent such a great amount of unburned fuel component that cannot be fully purified by a NOx catalyst from being supplied to the NOx catalyst during the adding period A. Further, if a total amount $(GF+Q1) \cdot t$ of the unburned fuel component supplied to the NOx catalyst during the adding period A reaches an allowable upper limit value UL, the concentrated intermittent fuel addition is canceled and a suspend period B is forcibly started. Accordingly, it is possible to prevent a total amount of such a great amount of unburned fuel component that cannot be fully purified by the NOx catalyst from being supplied to the NOx catalyst during the adding period A. Therefore, generation of white smoke in exhaust gas of the internal combustion engine by an excessive supply of the unburned fuel component to the NOx catalyst at a time of executing catalyst recovery control can be prevented.

6 Claims, 6 Drawing Sheets

FOREIGN PATENT DOCUMENTS

| | | |
|---|---|---|
| EP | 1 536 121 A1 | 6/2005 |
| JP | 2002-256951 A | 9/2002 |
| JP | 2005-083353 A | 3/2005 |
| JP | 2005-113741 A | 4/2005 |
| JP | 2005-133703 A | 5/2005 |
| JP | 2005-155422 A | 6/2005 |
| WO | 02/066813 A1 | 8/2002 |

* cited by examiner

EXHAUST GAS PURIFICATION APPARATUS OF INTERNAL COMBUSTION ENGINE

FIELD OF THE INVENTION

The present invention relates to an exhaust gas purification apparatus of an internal combustion engine.

BACKGROUND OF THE INVENTION

As an exhaust gas purification apparatus of an internal combustion engine such as a diesel engine or the like, there has been known a storage reduction type NOx catalyst provided in an exhaust system and carrying out an exhaust gas purification of nitrogen oxides (NOx).

In the exhaust gas purification apparatus mentioned above, a NOx storage capacity of the NOx catalyst is lowered by storage of sulfur oxides (SOx) or the like in the NOx catalyst. Accordingly, in many of this kind of exhaust gas purification apparatuses, a catalyst recovery control for recovering the NOx storage capacity of the NOx catalyst which has been lowered by the storage of the SOx, at a predetermined point in time. For example, in Patent Document 1, a point in time for executing the catalyst recovery control is defined by considering temporary deterioration caused by the storage of SOx in the NOx catalyst, and a permanent deterioration such as thermal deterioration in the NOx catalyst or the like. The greater the permanent deterioration of the NOx catalyst becomes, the shorter interval the catalyst recovery control is executed at.

Further, in the catalyst recovery control mentioned above, the temperature of the catalyst is raised, for example, to about 600° C. to 700° C. through supply of unburned fuel component to the NOx catalyst of the exhaust system, and the air-fuel ratio of exhaust gas is made rich (the air-fuel ratio of the exhaust gas is made small) under such a high temperature. Accordingly, release and reduction of SOx from the NOx catalyst are promoted, and the recovery of the NOx storage capacity of the catalyst is achieved.

In this case, in order to make the air-fuel ratio of the exhaust gas rich in a state of a raised temperature of the NOx catalyst, for example, unburned fuel component may be added to a section upstream of the NOx catalyst through a concentrated intermittent fuel addition, thereby setting an air-fuel ratio detected by an air-fuel ratio sensor provided in the exhaust system to a target air-fuel ratio which is richer than a stoichiometric air-fuel ratio.

If the state in which the air-fuel ratio of the exhaust gas is made rich through the concentrated intermittent fuel addition lasts long, the heat generation caused by the oxidation of the unburned fuel component in the exhaust gas or on the catalyst becomes large, and the temperature of the NOx catalyst may be excessively raised. Accordingly, in the catalyst recovery control, the adding period, in which the concentrated intermittent fuel addition mentioned above is carried out, and a suspend period, in which the fuel addition is stopped, are repeated, thereby intermittently making the air-fuel ratio of the exhaust gas rich and suppressing an excessive temperature rising of the NOx catalyst.

If the thermal deterioration occurs in the NOx catalyst or an abnormality occurs in the air-fuel ratio sensor during the adding period of the catalyst recovery control, the unburned fuel component is excessively supplied to the NOx catalyst, and that white smoke can be generated in the exhaust gas of the internal combustion engine.

In other words, in the case that the thermal deterioration occurs in the NOx catalyst, the processing capacity, that is, the purifying capacity of unburned fuel component of the NOx catalyst is lowered. Under such a condition, if the concentrated intermittent fuel addition is executed during the adding period of the catalyst recovery control, the unburned fuel component cannot be sufficiently processed by the NOx catalyst. In other words, unburned fuel component is excessively supplied to the NOx catalyst. As a result, white smoke is generated in the exhaust gas of the internal combustion engine.

Further, in the case where an abnormality occurs in the air-fuel ratio sensor, the air-fuel ratio detected by the sensor can become leaner than the actual air-fuel ratio. Under such a condition, unburned fuel component the amount of which cannot be processed by the NOx catalyst is supplied to the NOx catalyst during the adding period of the catalyst recovery control, in order to set the air-fuel ratio detected by the air-fuel ratio sensor to the target air-fuel ratio. As a result, white smoke is generated in the exhaust gas of the internal combustion engine.

Patent Document 1: Japanese Laid-Open Patent Publication No. 2002-256951

SUMMARY OF THE INVENTION

Accordingly, it is an objective of the present invention to provide an exhaust gas purification apparatus of an internal combustion engine which prevents generation of white smoke in exhaust gas due to excessive supply of unburned fuel component to a NOx catalyst at a time of executing catalyst recovery control.

To achieve the foregoing objective and in accordance with one aspect of the present invention, an exhaust gas purification apparatus of an internal combustion engine is provided. The exhaust gas purification apparatus includes a storage reduction type NOx catalyst provided in an exhaust system of the internal combustion engine. The NOx catalyst is subjected to catalyst recovery control for releasing sulfur oxide stored in the NOx catalyst. Accordingly, an adding period for carrying out a concentrated intermittent fuel addition to a section upstream of the NOx catalyst of the exhaust system and a suspend period during which the concentrated intermittent fuel addition is stopped are repeated in the catalyst recovery control. The concentrated intermittent fuel addition is carried out in such a manner that an air-fuel ratio detected by an air-fuel ratio sensor provided in the exhaust system during the adding period comes to a target air-fuel ratio which is richer than a stoichiometric air-fuel ratio. The exhaust gas purification apparatus includes a control unit that limits a fuel adding amount each time in the intermittent fuel addition to a predetermined value or less. The control unit sets the predetermined value such that a fuel adding amount per unit time during the adding period becomes equal to or less than an allowable upper limit value at and below which the NOx catalyst is capable of fully purifying unburned fuel component.

In accordance with another aspect of the present invention, an exhaust gas purification apparatus of an internal combustion engine is provided. The exhaust gas purification apparatus includes a storage reduction type NOx catalyst provided in an exhaust system of the internal combustion engine. The NOx catalyst is subjected to catalyst recovery control for releasing sulfur oxide stored in the NOx catalyst. Accordingly, an adding period for carrying out a concentrated intermittent fuel addition to a section upstream of the NOx catalyst of the exhaust system and a suspend period during which the concentrated intermittent fuel addition is stopped are repeated in the catalyst recovery control. The concentrated intermittent fuel addition is carried out in such a manner that an air-fuel ratio detected by an air-fuel ratio sensor provided in the exhaust system during the adding period comes to a target air-fuel ratio which is richer than a stoichiometric air-fuel ratio. The exhaust gas purification apparatus includes a control unit that cancels the concentrated intermittent fuel addition so as to forcibly shift the adding period to the suspend period at a time when a total amount of the unburned fuel component supplied to the NOx catalyst during the adding period reaches a predetermined value. The control unit sets the predetermined value to an allowable upper limit value at and below which the NOx catalyst is capable of fully purifying an unburned fuel component.

DETAILED DESCRIPTION OF THE PREFERRED EMBODIMENTS

One embodiment of the present invention applied to an internal combustion engine for an automobile will be described with reference to FIGS. 1 to 6.

Figure 1:
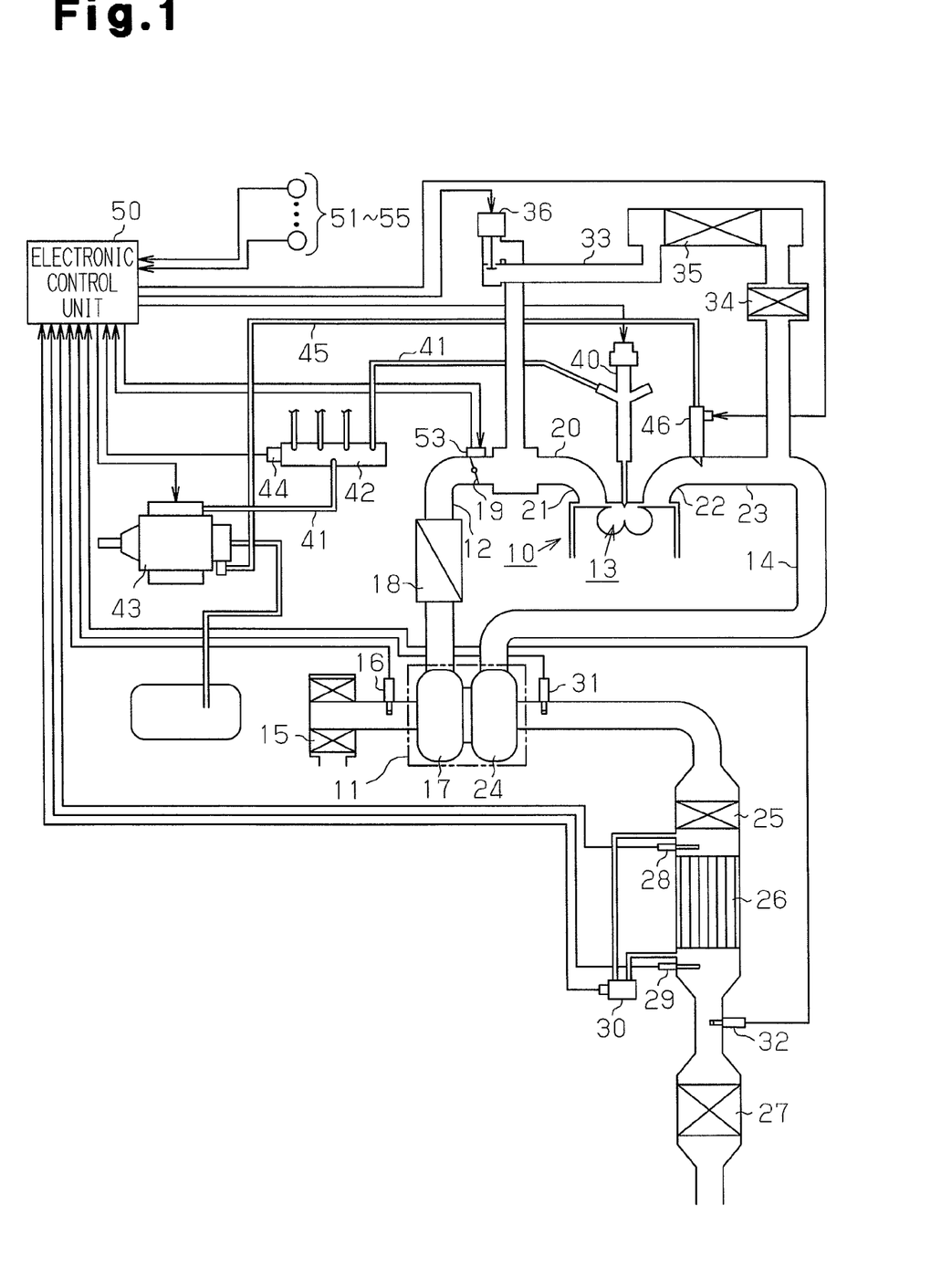
FIG. 1 is a schematic view showing an entire internal combustion engine to which an exhaust gas purification apparatus in accordance with the present embodiment is applied.

FIG. 1 shows a structure of an internal combustion engine 10 to which an exhaust gas purification apparatus in accordance with the present embodiment is applied. The internal combustion engine 10 is a diesel engine including a common rail type fuel injection apparatus and a turbocharger 11. The engine 10 including an intake passage 12, combustion chambers 13, and an exhaust passage 14.

In the intake passage 12 constructing an intake system of the internal combustion engine 10 are arranged an air cleaner 15, an air flow meter 16, a compressor 17 of the turbocharger 11, an intercooler 18 and an intake throttle valve 19, from the most upstream side toward the downstream side. The intake passage 12 is branched in an intake manifold 20 provided on the downstream side of the intake throttle valve 19 and is connected to the combustion chamber 13 of each of the cylinders via an intake port 21.

In the exhaust passage 14 constructing an exhaust system of the internal combustion engine 10, an exhaust port 22 is connected to the combustion chamber 13 in each of the cylinders. The exhaust port 22 is connected to an exhaust turbine 24 of the turbocharger 11 via an exhaust manifold 23. A NOx catalytic converter 25, a PM filter 26, and an oxidation catalytic converter 27 are arranged on the downstream side of the exhaust turbine 24 of the exhaust passage 14 in this order from the upstream side.

The NOx catalytic converter 25 supports a storage reduction type NOx catalyst. The NOx catalyst stores NOx in exhaust gas at a time when the oxygen concentration of the exhaust gas is high, and releases the stored NOx at a time when the oxygen concentration of the exhaust gas is low. Further, the NOx catalyst reduces and purifies the released NOx if a sufficient amount of unburned fuel component serving as a reducing agent exists around the NOx catalyst at the time of releasing the NOx.

A PM filter 26 is formed by a porous material, and is structured to collect particulate matter (PM) having a soot in the exhaust gas as a main component. The PM filter 26 supports the storage reduction type NOx catalyst in the same manner as the NOx catalytic converter 25, and is structured to purify the NOx in the exhaust gas. Further, on the basis of a reaction triggered by the NOx catalyst, the collected PM is burnt (oxidized) so as to be removed.

The oxidation catalytic converter 27 supports an oxidation catalyst. The oxidation catalyst oxidizes and purifies hydro carbon (HC) or carbon monoxide (CO) in the exhaust gas.

On the upstream side and the downstream side of the PM filter 26 of the exhaust passage 14, an input gas temperature sensor 28 and an output gas temperature sensor 29 are arranged respectively. The input gas temperature sensor 28 detects an input gas temperature, which is the temperature of the exhaust gas flowing in the PM filter 26, and the output gas temperature sensor 29 detects an output gas temperature, which is a temperature of the exhaust gas after passing through the PM filter 26. Further, a differential pressure sensor 30 is arranged in the exhaust passage 14. The differential pressure sensor 30 detects a differential pressure of the exhaust gas between the upstream side and the downstream side of the PM filter 26. Further, two air-fuel ratio sensors 31 and 32 detecting the air-fuel ratio of the exhaust gas are respectively arranged in the exhaust passage 14. The sensor 31 is arranged on the upstream side of the NOx catalytic converter 25 and the sensor 32 is arranged between the PM filter 26 and the oxidation catalytic converter 27.

Further, the internal combustion engine 10 is provided with an exhaust gas recirculation (hereinafter, refer to as an EGR) apparatus for recirculating a part of the exhaust gas in the air within the intake passage 12. The EGR apparatus includes an EGR passage 33 connecting the exhaust passage 14 with the intake passage 12. A most upstream section of the EGR passage 33 is connected to the upstream side of the exhaust turbine 24 of the exhaust passage 14. In the EGR passage 33, there are arranged an EGR catalyst 34 reforming the recirculated exhaust gas, an EGR cooler 35 cooling the exhaust gas, and an EGR valve 36 regulating a flow rate of the exhaust gas, in this order from the upstream side thereof. Further, a most downstream portion of the EGR passage 33 is connected to the downstream side of the intake throttle valve 19 of the intake passage 12.

An injector 40 injecting the fuel for combustion within the combustion chamber 13 is arranged in the combustion chamber 13 of each of the cylinders of the internal combustion engine 10. The injectors 40 of the cylinders are connected to a common rail 42 via a high pressure fuel supply pipe 41. The high pressure fuel is supplied from a fuel pump 43 through the common rail 42. The pressure of the high pressure fuel within the common rail 42 is detected by a rail pressure sensor 44 attached to the common rail 42. Further, a low pressure fuel is supplied to an adding valve 46 from the fuel pump 43 through a low pressure fuel supply pipe 45.

Various types of controls of the internal combustion engine 10 as mentioned above are executed by an electronic control unit 50. The electronic control unit 50 includes a CPU executing various types of computation processes relating to the engine control, a ROM in which programs and data necessary for the control are stored, a RAM in which results of computation of the CPU or the like are temporarily stored, input and output ports for inputting and outputting signals with respect to the outside.

In addition to the sensors mentioned above, an NE sensor 51 detecting an engine rotating speed, an accelerator sensor 52 detecting an operating amount of an accelerator pedal, a throttle valve sensor 53 detecting an opening degree of the intake throttle valve 19, an intake air temperature sensor 54 detecting a temperature of the intake air of the internal combustion engine 10, and a water temperature sensor 55 detecting a coolant temperature of the engine 10 are connected to the input port of the electronic control unit 50. Further, drive circuits such as the intake throttle valve 19, the EGR valve 36, the injector 40, the fuel pump 43, the adding valve 46 are connected to an output port of the electronic control unit 50.

The electronic control unit 50 outputs a command signal to a drive circuit of each of the devices connected to the output port based on an operating state of the internal combustion engine obtained through detection signals input from each of the sensors. As mentioned above, the electronic control unit 50 executes various types of controls such as opening degree control of the intake throttle valve 19, EGR control on the basis of the opening degree control of the EGR valve 36, control of fuel injection amount, fuel injection timing and fuel injection pressure from the injector 40, and control of a fuel addition from the adding valve 46 are executed by.

In the present embodiment structured as mentioned above, in order to recover the NOx storage capacity of the NOx catalyst which is lowered by the storage of the sulfur oxide (SOx) or the like in the NOx catalyst, catalyst recovery control is executed. The catalyst recovery control mentioned above starts at a time when a SOx storing amount of the NOx catalyst calculated on the basis of a history of the operating state of the internal combustion engine becomes equal to or more than an allowable value. The catalyst recovery control includes temperature raising control, and subsequent S release control. In the temperature raising control, the temperature of the catalyst is raised, for example, to about 600° C. to 700° C. through the supply of the unburned fuel component to the NOx catalyst. In the S release control, the release of the SOx from the NOx catalyst and reduction thereof are promoted by making the exhaust gas air-fuel ratio rich under the high temperature after the temperature raising control. As mentioned above, the recovery of the NOx storage capacity of the NOx catalyst is achieved by carrying out the temperature raising control and the S release control in the catalyst recovery control. The supply of the unburned fuel component to the NOx catalyst in the catalyst recovery control is carried out by, for example, adding the fuel to the exhaust gas from the adding valve 46.

Next, a description will be given of an outline of the catalyst recovery control by dividing the result into the temperature raising control and the S release control mentioned above, respectively with reference to time charts in FIGS. 2 and 3.

Temperature Raising Control

In the temperature raising control in the catalyst recovery control, a target floor temperature Tt of the NOx catalyst is discretely set, for example, to 700° C. The supply of unburned fuel component to the NOx catalyst is carried out through the fuel addition from the adding valve 46 in such a manner that the catalyst floor temperature T rises toward the target floor temperature Tt.

Figure 2A:
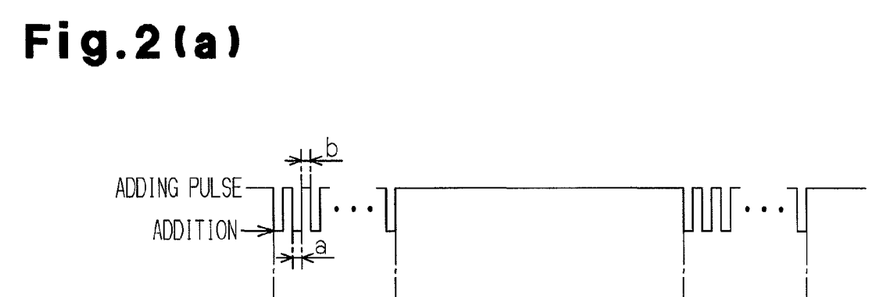
FIGS. 2(a) to 2(d) are time charts respectively showing changes of an additional pulse for driving an additional valve during temperature raising control in a catalyst recovery control, changes of a catalyst floor temperature T, a transition of integrated values ΣQr and ΣQ, and the state of an addition allowing flag F1.
Figure 2B:
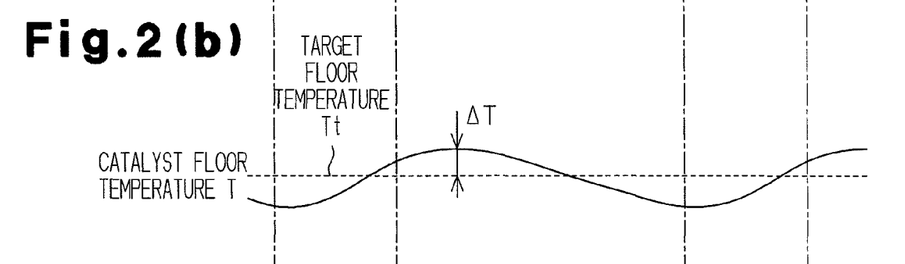
Figure 2C:
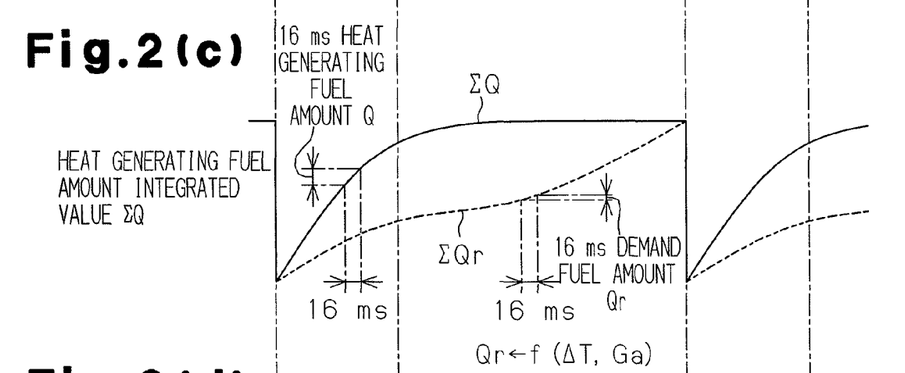
Figure 2D:
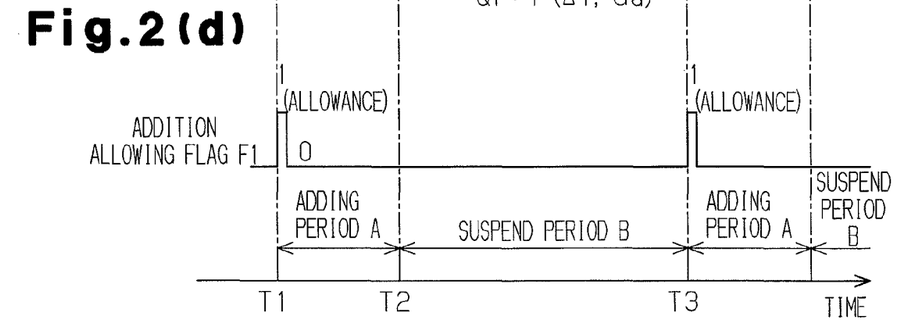

The fuel addition from the adding valve 46 is started at a time (time T1) when an addition allowing flag F1 is changed to "1" from "0" as illustrated in FIG. 2(d). The sign "1" denotes allowance. The addition allowing flag F1 is returned to "0" after becoming to "1". Further, if the fuel addition from the adding valve 46 is started, a concentrated intermittent fuel addition from the adding valve 46 is executed in accordance with an adding pulse illustrated in FIG. 2(a). An adding time a of the fuel in the fuel addition, and a suspend time b of the fuel addition are set based on a temperature difference $\Delta T$ between the target floor temperature Tt and the catalyst floor temperature T, and a gas flow rate Ga of the internal combustion engine 10 (corresponding to the exhaust gas flow rate of the engine 10) detected by the air flow meter 16. The concentrated intermittent fuel addition started as mentioned above is continued until a predetermined number of times of fuel addition is executed, and is stopped after the fuel addition is carried out the number of times (time T2).

Each time when a predetermined time, for example, 16 ms has passed after the fuel addition from the adding valve 46 starts, a 16 ms heat generating fuel amount Q, which is the amount of the fuel added from the adding valve 46 during the 16 ms, is calculated on the basis of a driving state of the adding valve 46. A heat generating fuel amount integrated value $\Sigma Q$ is calculated by integrating the 16 ms heat generating fuel amount Q based on the following expression per calculation.

$$\Sigma Q \leftarrow \text{previous} \Sigma Q + Q \tag{1}$$

The heat generating fuel amount integrated value $\Sigma Q$ expresses the total fuel adding amount from the fuel addition starting time point (T1), that is, a total fuel amount contributing to the heat generation from the oxidation reaction. As illustrated by a solid line in FIG. 2(c), the heat generating fuel amount integrated value $\Sigma Q$ calculated as mentioned above is rapidly increased during an adding period A, which is a period from the start of the fuel addition to the end thereof, and comes to a horizontal state (plateau) during a subsequent suspend period B of the fuel addition.

On the other hand, every time when the predetermined time (16 ms) has passed after the fuel addition from the adding valve 46 starts, a 16 ms demand fuel amount Qr, which is the amount of the fuel to be added from the adding valve 46 during the 16 ms, is calculated. The 16 ms demand fuel amount Qr is an adding amount of the fuel necessary for making the catalyst floor temperature T close to the target floor temperature Tt. The calculation of the 16 ms demand fuel amount Qr is carried out by using a temperature difference $\Delta T$ between the catalyst floor temperature T and the target floor temperature Tt, and a gas flow rate Ga of the internal combustion engine 10. The 16 ms demand fuel amount Qr thus calculated becomes larger as the catalyst floor temperature T becomes lower with respect to the target floor temperature Tt, and becomes smaller inversely as the catalyst floor temperature T becomes higher with respect to the target floor temperature Tt. The demand fuel amount integrated value $\Sigma Qr$ is calculated by integrating the 16 ms demand fuel amount Qr on the basis of the following expression per calculation.

$$\Sigma Qr \leftarrow \text{previous} \Sigma Qr + Qr \tag{2}$$

The demand fuel amount integrated value ΣQr expresses the fuel amount from the fuel addition starting time point (T1) necessary for setting a mean value of the catalyst floor temperature T to the target floor temperature Tt. As illustrated by a broken line in FIG. 2(c), the demand fuel amount integrated value ΣQr (a dotted line) calculated as mentioned above is slowly increased in comparison with the increase (a solid line) of the heat generating fuel amount integrated value ΣQ.

If the demand fuel amount integrated value ΣQr becomes equal to or more than the heat generating fuel amount integrated value ΣQ (time T3), the addition allowing flag F1 is changed to "1" from "0", and the concentrated intermittent fuel addition from the adding valve 46 is started. At this time, since addition of the fuel at the heat generating fuel amount integrated value ΣQ after the time T1 is finished, the heat generating fuel amount integrated value ΣQ is subtracted from the demand fuel amount integrated value ΣQr. Further, the heat generating fuel amount integrated value ΣQ is cleared to 0 (zero). Further, the period is again changed to the adding period A in accordance with the start of the concentrated intermittent fuel addition from the adding valve 46, and is changed to the suspend period B if the adding period A is over. Accordingly, the adding period A and the suspend period B are repeated during the temperature raising control in accordance with the catalyst recovery control.

In the temperature raising control, the lower the catalyst floor temperature T than the target floor temperature Tt, the larger the calculated the 16 ms demand fuel amount Q becomes, and the demand fuel amount integrated value ΣQr is quickly increased. As a result, a time necessary for the demand fuel amount integrated value ΣQr to become equal to or more than the heat generating fuel amount integrated value ΣQ becomes shorter, and the suspend period B becomes shorter. Accordingly, the mean value of the fuel adding amount from the adding valve 46 per unit time becomes large. It is possible to raise the catalyst floor temperature T, which is lower than the target floor temperature Tt, toward the target floor temperature Tt, by making the mean value of the fuel adding amount great.

Further, the closer the catalyst floor temperature T to the target floor temperature Tt, the smaller the calculated 16 ms demand fuel amount Qr becomes, and the demand fuel amount integrated value ΣQr is slowly increased. As a result, the time necessary for the demand fuel amount integrated value ΣQr to become equal to or more than the heat generating fuel amount integrated value ΣQ becomes longer, and the suspend period B becomes longer. Accordingly, the mean value of the fuel adding amount from the adding valve 46 per unit time becomes smaller. The catalyst floor temperature T is prevented from being excessively higher than the target floor temperature Tt, by making the mean value of the fuel adding amount small.

As described above, the catalyst floor temperature T is changed, for example, as illustrated by the solid line in FIG. 2(b), by changing the length of the suspend period B based on a divergence state with respect to the target floor temperature Tt of the catalyst floor temperature T, and a center fluctuation of the increasing and decreasing catalyst floor temperature T is controlled to the target floor temperature Tt. It is possible to raise the catalyst floor temperature T of the NOx catalyst, for example, to about 700° C., by supplying the unburned fuel component to the catalyst in such a manner that the catalyst floor temperature T comes to the target floor temperature Tt as mentioned above.

S Release Control

If the catalyst floor temperature T of the NOx catalyst rises to about 700° C. through the temperature raising control mentioned above, then, an S release control for promoting the release of the SOx from the NOx catalyst and reduction thereof by making the exhaust gas air-fuel ratio rich under the high temperature is executed. In this S release control, the concentrated intermittent fuel addition from the adding valve 46 is executed in such a manner as to execute the fuel addition substantially at the same amount as the total fuel adding amount during the adding period A (FIG. 2) in the temperature raising control for a shorter period, thereby making the air-fuel ratio of the exhaust gas richer than the stoichiometric air-fuel ratio.

In this case, if the concentrated intermittent fuel addition mentioned above is continued, the catalyst floor temperature T of the NOx catalyst excessively may rise. Accordingly, after executing the concentrated intermittent fuel addition for the shorter period than the adding period A in the temperature raising control as mentioned above, the concentrated intermittent fuel addition is stopped for a longer period than the suspend period B (FIG. 2) in the temperature raising control. Then the concentrated intermittent fuel addition and the stop of the fuel addition are repeated, whereby the suppression of the excessive rise of the catalyst floor temperature T is achieved.

The suspend period of the concentrated intermittent fuel addition in the S release control is set to the longer period than the suspend period B in the temperature raising control for the following reason. That is, since the catalyst floor temperature T rises more rapidly to the higher value on the basis of the concentrated intermittent fuel addition, it is necessary to enlarge a decrease amount of the catalyst floor temperature T by keeping the suspend period of the intermittent fuel addition long for keeping the means value of the catalyst floor temperature T constant at the target floor temperature Tt.

A description will be given in detail of the fuel addition and the stop of the fuel addition in the S release control.

Figure 3A:
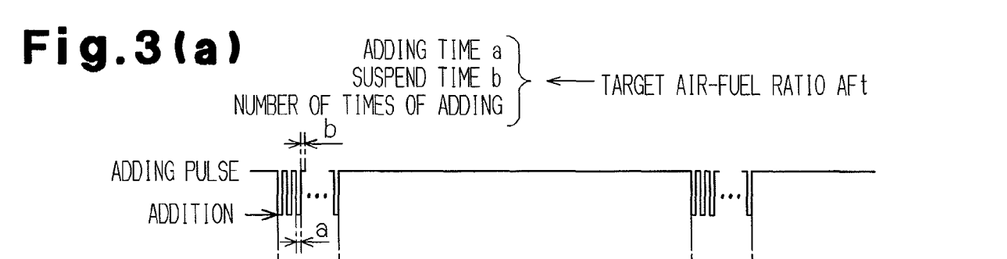
FIGS. 3(a) to 3(e) are time charts respectively showing changes of the additional pulse for driving the additional valve during S release control in the catalyst recovery control, changes of the air-fuel ratio of exhaust gas, changes of the catalyst floor temperature T, a transition of the integrated values ΣQr and ΣQ, and the state of the addition allowing flag F1.
Figure 3B:
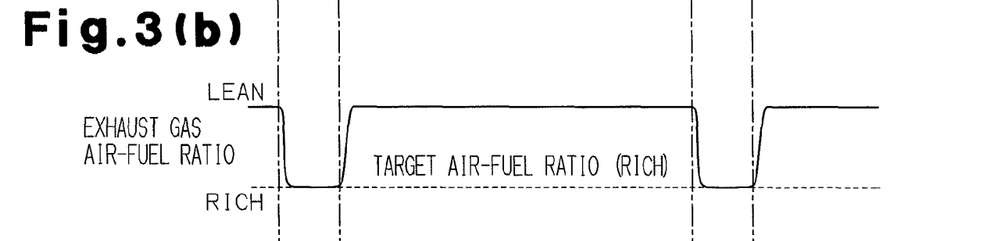
Figure 3C:
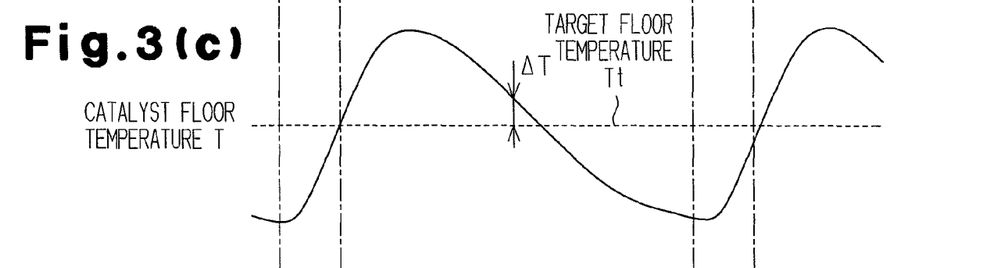
Figure 3D:
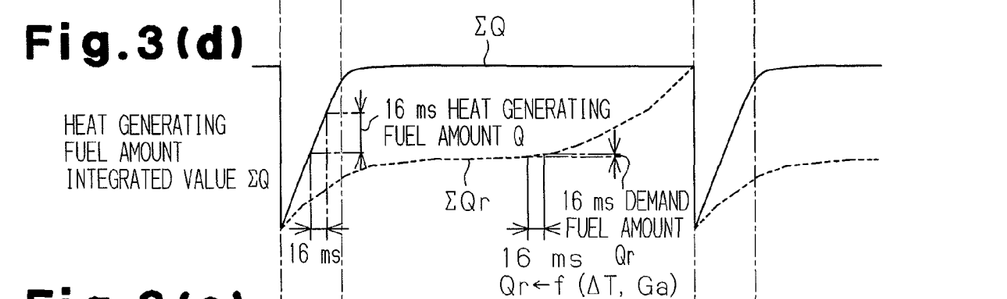
Figure 3E:
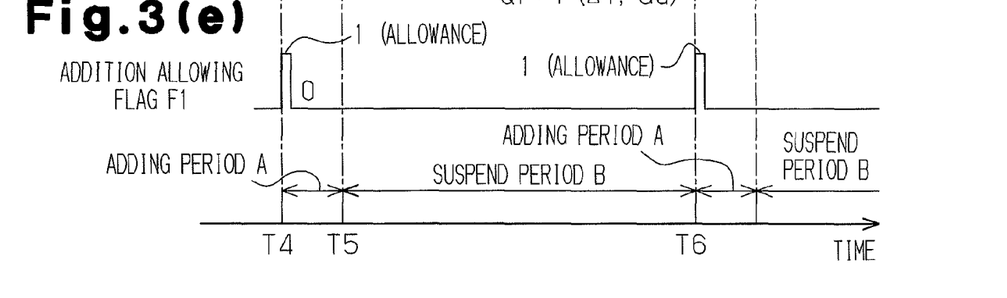

The concentrated intermittent fuel addition in the S release control is started at a time (time T4) when the addition allowing flag F1 is changed to "1" from "0", as illustrated in FIG. 3(e) in the same manner as the fuel addition in the temperature raising control. "1" denotes allowance. If the concentrated intermittent fuel addition is started, the concentrated intermittent fuel addition from the adding valve 46 is carried out in accordance with an addition pulse illustrated in FIG. 3(a). The parameters, for example, the adding time a of the fuel, the suspend time b of the fuel addition, and the number of times of adding of the fuel in the concentrated intermittent fuel addition are regulated in such a manner that the air-fuel ratio detected by the air-fuel ratio sensors 31 and 32 comes close to a target air-fuel ratio AFt, which is richer than the stoichiometric air-fuel ratio.

In other words, the adding time a is made longer as the air-fuel ratio detected by the air-fuel ratio sensors 31 and 32 becomes leaner compared to the target air-fuel ratio AFt, and the suspend time b, that is, the addition interval of the fuel is made shorter as the air-fuel ratio detected by the air-fuel ratio sensors 31 and 32 becomes leaner compared to the target air-fuel ratio AFt. Further, the number of times of adding is increased as the air-fuel ratio detected by the air-fuel ratio sensors 31 and 32 becomes leaner compared to the target air-fuel ratio AFt.

In the S release control, as illustrated in FIG. 3(d), the 16 ms heat generating fuel amount Q and the heat generating fuel amount integrated value ΣQ are calculated in the same manner as the temperature raising control. The 16 ms heat generating fuel amount Q in the adding period A (T4-T5) in the S release control is larger than the 16 ms heat generating fuel amount Q in the adding period A (FIG. 2) in the temperature raising control. Accordingly, the heat generating fuel amount integrated value ΣQ (a solid line in FIG. 3(d)) obtained by integrating the 16 ms heat generating fuel amount Q on the basis of the expression (1) mentioned above per calculation is rapidly increased in comparison with the heat generating fuel amount integrated value ΣQ (FIG. 2) in the adding period A in the temperature raising control.

The air-fuel ratio of the exhaust gas comes to the target air-fuel ratio AFt, which is richer than the stoichiometric air-fuel ratio, at the times T4-T5 of FIG. 3(b), by carrying out the concentrated intermittent fuel addition as mentioned above. As a result, the exhaust gas air-fuel ratio is made rich under the high temperature in which the catalyst floor temperature T of the NOx catalyst is about 700° C., whereby the release of the SOx from the NOx catalyst and the reduction thereof are promoted.

Meanwhile, after starting the concentrated intermittent fuel addition, the calculation of the 16 ms demand fuel amount Qr is carried out in the same manner as the temperature raising control. The 16 ms demand fuel amount Qr is reduced as the catalyst floor temperature T is increased compared to the target floor temperature Tt (the temperature difference ΔT is larger), as illustrated in FIG. 3(c). Further, the temperature difference ΔT under the condition that the catalyst floor temperature T is higher than the target floor temperature Tt becomes larger than the temperature difference ΔT (FIG. 2(b)) under the temperature raising control, due to the rising of the catalyst floor temperature T as mentioned above. As a result, the 16 ms demand fuel amount Qr at a time when the catalyst floor temperature T is higher than the target floor temperature Tt under the S release control tends to become smaller than the corresponding 16 ms demand fuel amount Qr (FIG. 2(c)) under the temperature raising control.

Accordingly, the demand fuel amount integrated value ΣQr (a broken line in FIG. 3(d)) obtained by integrating the 16 ms demand fuel amount Qr per calculation on the basis of the expression (2) mentioned above is slowly increased in comparison with the demand fuel amount integrated value ΣQr (FIG. 2) in the suspend period B under the temperature raising control. Accordingly, a time when the demand fuel amount integrated value ΣQr becomes equal to or more than the heat generating fuel amount integrated value ΣQ (time T6) and the addition allowing flag F1 is changed to "1" from "0", that is, an end timing of the suspend period B is delayed compared with the temperature raising control. In accordance with the fact mentioned above, the suspend period B during the S release control is longer than the suspend period B (FIG. 2) during the temperature raising control.

If the addition allowing flag F1 is changed to "1", the concentrated intermittent fuel addition is again started. At this time, the heat generating fuel amount integrated value ΣQ is subtracted from the demand fuel amount integrated value ΣQr, in the same manner as the temperature raising control. Further, the heat generating fuel amount integrated value ΣQ is cleared to 0 (zero). Further, the period is changed again to the adding period A in accordance with the start of the concentrated intermittent fuel addition. If the adding period A is finished, the period is changed to the suspend period B. Again, in the S release control, the adding period A and the suspend period B are repeated, whereby the center of fluctuation of the catalyst floor temperature T is controlled to the target floor temperature Tt (about 700° C.) in the same manner as the temperature raising control.

As mentioned above, the adding period A and the suspend period B are repeated, and the release of the SOx from the NOx catalyst and the reduction thereof are promoted during the adding period A, whereby the SOx storing amount of the NOx catalyst is reduced and the NOx storage capacity of the NOx catalyst is recovered. Further, if the SOx storing amount of the NOx catalyst is lowered to a predetermined value (for example, 0 (zero)), the S release control, and finally the catalyst recovery control are finished.

In this case, if the thermal deterioration of the NOx catalyst occurs or the abnormality occurs in the air-fuel ratio sensors 31 and 32 as mentioned above, unburned fuel component is excessively supplied to the NOx catalyst during the adding period A of the catalyst recovery control, and a white smoke may be generated in the exhaust gas of the internal combustion engine 10.

Accordingly, the present embodiment executes an adding amount limitation for limiting the fuel adding amount at a time of the concentrated intermittent fuel addition in the adding period A so as to prevent generation of white smoke. Further, a fuel addition interruption is executed for canceling the fuel addition from the adding valve 46 and forcibly starting the suspend period B in the case that the total amount of the unburned fuel component supplied to the NOx catalyst from the start of the adding period A becomes so great as to generate white smoke in the exhaust gas.

It is possible to prevent a great amount of unburned fuel component which cannot be purified from being supplied to the NOx catalyst at a time when the concentrated intermittent fuel addition is carried out during the adding period A, by executing the adding amount limitation and the fuel addition interruption, whereby generation of white smoke from the exhaust gas of the internal combustion engine 10 is prevented.

Figure 4:
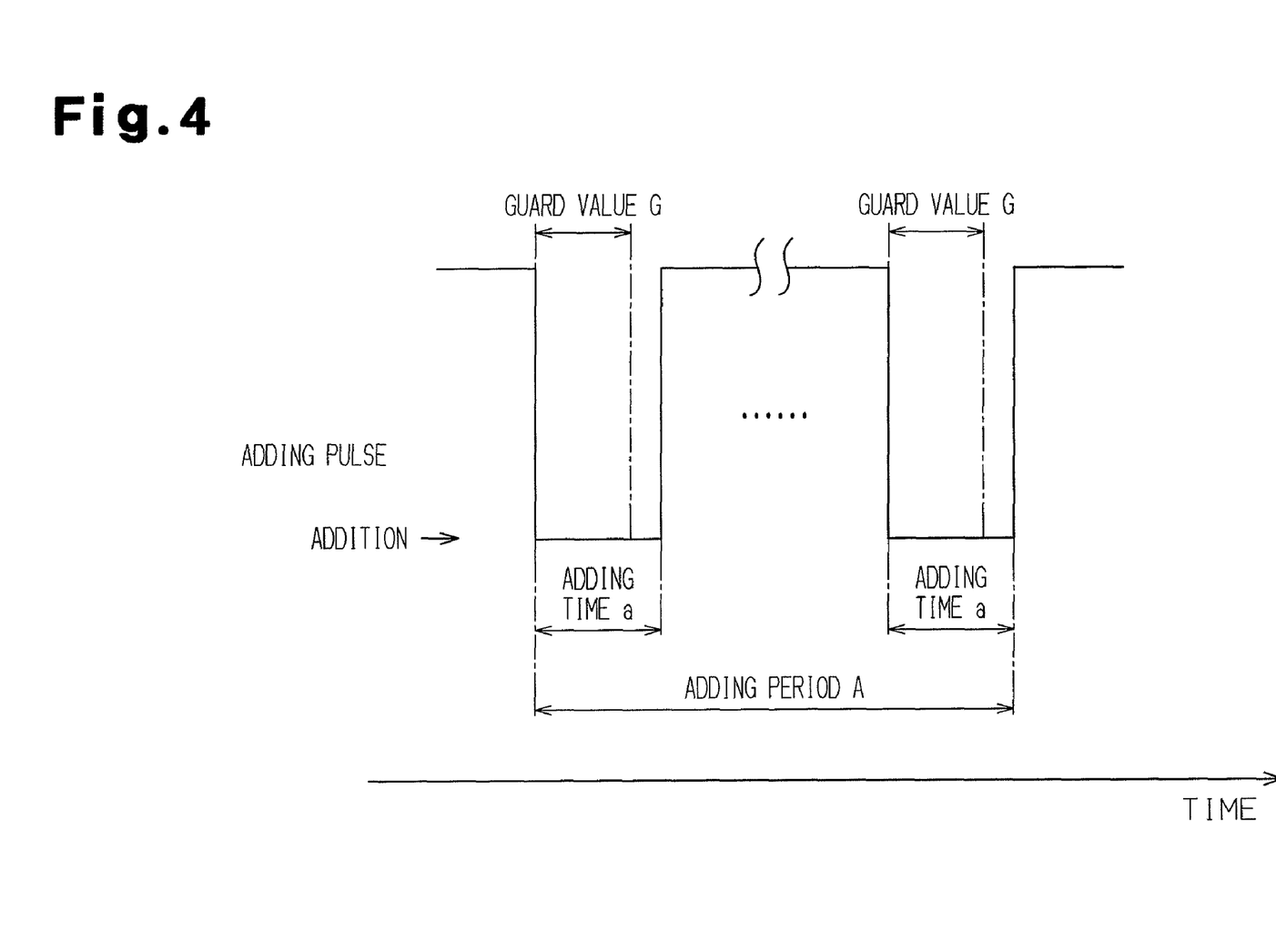
FIG. 4 is a waveform of the additional pulse for carrying out a fuel addition from the additional valve.

Next, a description will be given of an outline of the adding amount limitation with reference to a time chart in FIG. 4. FIG. 4 is a waveform of an adding pulse for carrying out the fuel addition from the adding valve 46.

The adding amount in each of a plurality of times of fuel addition during the adding period A is determined on the basis of the adding time a of the fuel addition per one time.

The fuel adding amount of each fuel addition during the adding period A is limited in such a manner as to prevent generation of white smoke in the exhaust gas, by limiting the adding time a to a guard value G or less.

The guard value G is a value for limiting the adding amount of fuel in each fuel addition to a predetermined value or less. In other words, the guard value G is determined as a value limiting the adding time a based on the predetermined value. The predetermined value is set such that the fuel adding amount per unit time during the adding period A becomes equal to or less than an allowable upper limit value Q1max at and below which the unburned fuel component by the NOx catalyst can be fully purified. Preferably, the predetermined value is set to Q1max·t/N. The value Q1max·t/N is a value obtained by multiplying the allowable upper limit value Q1max, at which the fuel adding amount per unit time during the adding period A can fully purify the unburned fuel component, by the elapsed time T from the start of the adding period A, and dividing the result by the number of times N of the fuel addition from the start of the adding period A. In other words, the predetermined value Q1max·t/N is a value corresponding to one-time adding amount of the fuel for setting the fuel adding amount per unit time to the allowable upper limit value Q1max capable of purifying the unburned fuel component by the NOx catalyst.

The allowable upper limit value Q1max for calculating the predetermined value Q1max·t/N is determined by using the following expression.

$$Q1max = GA/X - GF \quad (3)$$

In this expression (3), GA denotes an intake air flow rate (corresponding to a gas flow rate Ga detected by the air flow meter 16) of the internal combustion engine 10. X denotes an upper limit value of the exhaust gas air-fuel ratio at and below which the NOx catalyst can fully purify the unburned fuel component under a condition that the NOx catalyst is in a deteriorated state. X is previously determined to a value, for example, 13.6 by an experiment. GF denotes a flow rate of the unburned fuel component sent out to the exhaust passage 14 from the combustion chamber 13, and is calculated based on a fuel injection amount from the injector 40 (that is, a fuel injection amount per stroke of the internal combustion engine 10) and the engine speed.

The allowable upper limit value Q1max determined as mentioned above is a value corresponding to a maximum value of the fuel adding amount per unit time with which the NOx catalyst can fully purify the unburned fuel component under the condition that the NOx catalyst is in a deteriorated state. The allowable upper limit value Q1max becomes larger as the intake air flow rate GA of the internal combustion engine 10 becomes larger, and becomes smaller as the flow rate GF of the unburned fuel component sent out to the exhaust passage 14 from the combustion chamber 13 becomes larger. The allowable upper limit value Q1max is determined by using the expression (3) based on the values GA and GF as mentioned above. Accordingly the allowable upper limit value Q1max is set to a suitable value under the condition that the NOx catalyst is in the deteriorated state, in conformity with the changes in the values GA and GF.

Figure 5A:
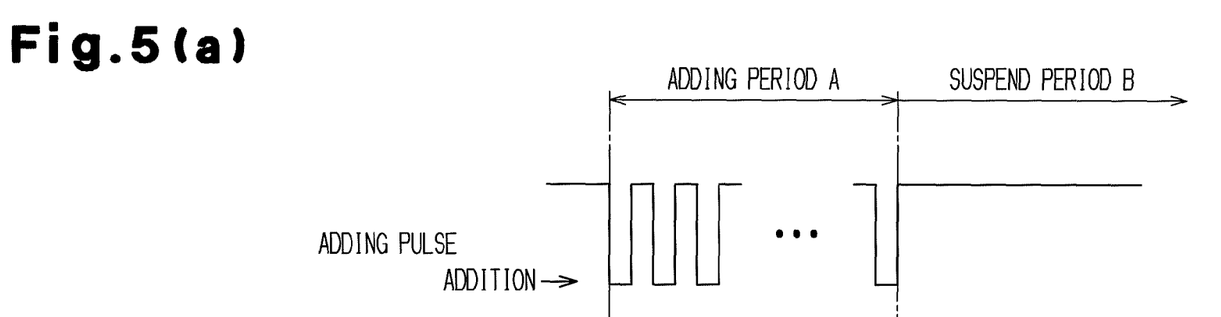
FIG. 5(a) is a waveform chart of the additional pulse for carrying out the fuel addition from the additional valve.

Next, a description will be given of an outline of the limitation of the total supply amount with reference to a time chart in FIGS. 5(a) and 5(b). FIG. 5(a) illustrates a waveform of the adding pulse for carrying out the fuel addition from the adding valve 46, and FIG. 5(b) is a time chart illustrating a transition of the total amount of the unburned fuel component supplied to the NOx catalyst.

Figure 5B:
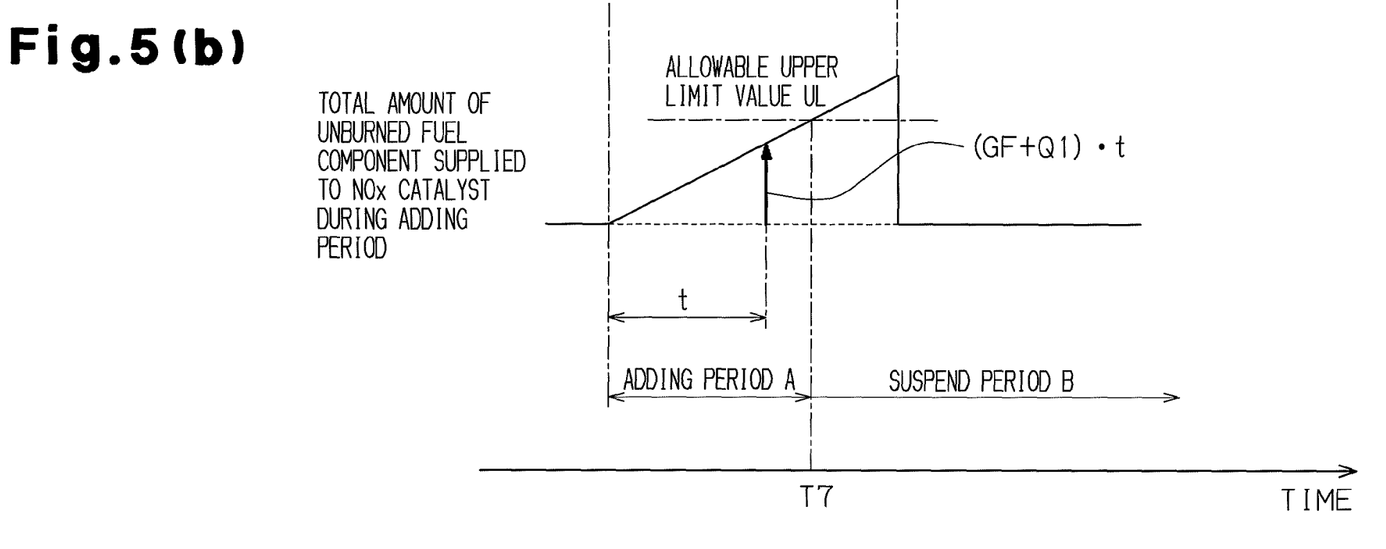
FIG. 5(b) is a time chart showing a transition of the total amount of unburned fuel component supplied to an NOx catalyst.

During the adding period A, the total amount (GF+Q1)·t of the unburned fuel component supplied to the NOx catalyst is gradually increased as illustrated by a solid line in FIG. 5(b) in accordance with the concentrated intermittent fuel addition from the adding valve 46 on the basis of the adding pulse illustrated in FIG. 5(a).

The total amount (GF+Q1) of the unburned fuel component supplied to the NOx catalyst is a value obtained by adding the fuel adding amount Q1 per unit time during the adding period A to the flow rate GF (mentioned above) of the unburned fuel component sent out to the exhaust passage 14 from the combustion chamber 13, and multiplying the value after adding by the elapsed time T from the start of the adding period A. In other words, the total amount (GF+Q1)·t is a value obtained by adding up the total amount (GF·t) of the unburned fuel component sent out to the exhaust passage 14 from the combustion chamber 13 during the adding period A, and the total amount (Q1·t) of the fuel added to the upstream side of the NOx catalyst from the adding valve 46 during the adding period A. Further, the fuel adding amount Q1 per unit time is calculated by multiplying the one-time adding amount QT of the fuel in the concentrated intermittent fuel addition during the adding period A by the number of times N of the fuel addition from the start of the adding period A, and dividing the result by the elapsed time T from the start of the adding period A. In this case, the one-time adding amount QT of the fuel is determined on the basis of the previously determined pressure and adding time a of the fuel supplied to the adding valve 46.

Further, if the total amount (GF+Q1)·t determined as described above reaches a predetermined value, that is, an allowable upper limit valve UL of the total amount at and below which the total amount can be fully purified by the NOx catalyst under the condition that the NOx catalyst is under the deteriorated state (time T7), the concentrated intermittent fuel addition in the adding period A is stopped and the suspend period B is forcibly started. Accordingly, when the concentrated intermittent fuel addition is carried out during the adding period A, it is possible to prevent a great amount of unburned fuel which cannot be fully purified from being supplied to the NOx catalyst. It is thus possible to inhibit white smoke generated in the exhaust gas in the internal combustion engine 10.

In this case, there is a tendency that the total amount of the unburned fuel component which can be fully purified by the NOx catalyst during the adding period A becomes larger as the intake air flow rate GA of the internal combustion engine 10 becomes larger and the amount of the oxygen supplied to the NOx catalyst is accordingly increased. In order to set the allowable upper limit value UL to an optimum value based on such tendency, the allowable upper limit value UL of the total amount is set to a larger value as the intake air flow rate GA becomes larger. Therefore, it is possible to set the time (T7), at which the concentrated intermittent fuel addition is interrupted and the suspend period B is forcibly started, to a point in time as delayed as possible for preventing generation of white smoke in the exhaust gas of the internal combustion engine 10 and carrying out a lot of fuel addition.

Figure 6:
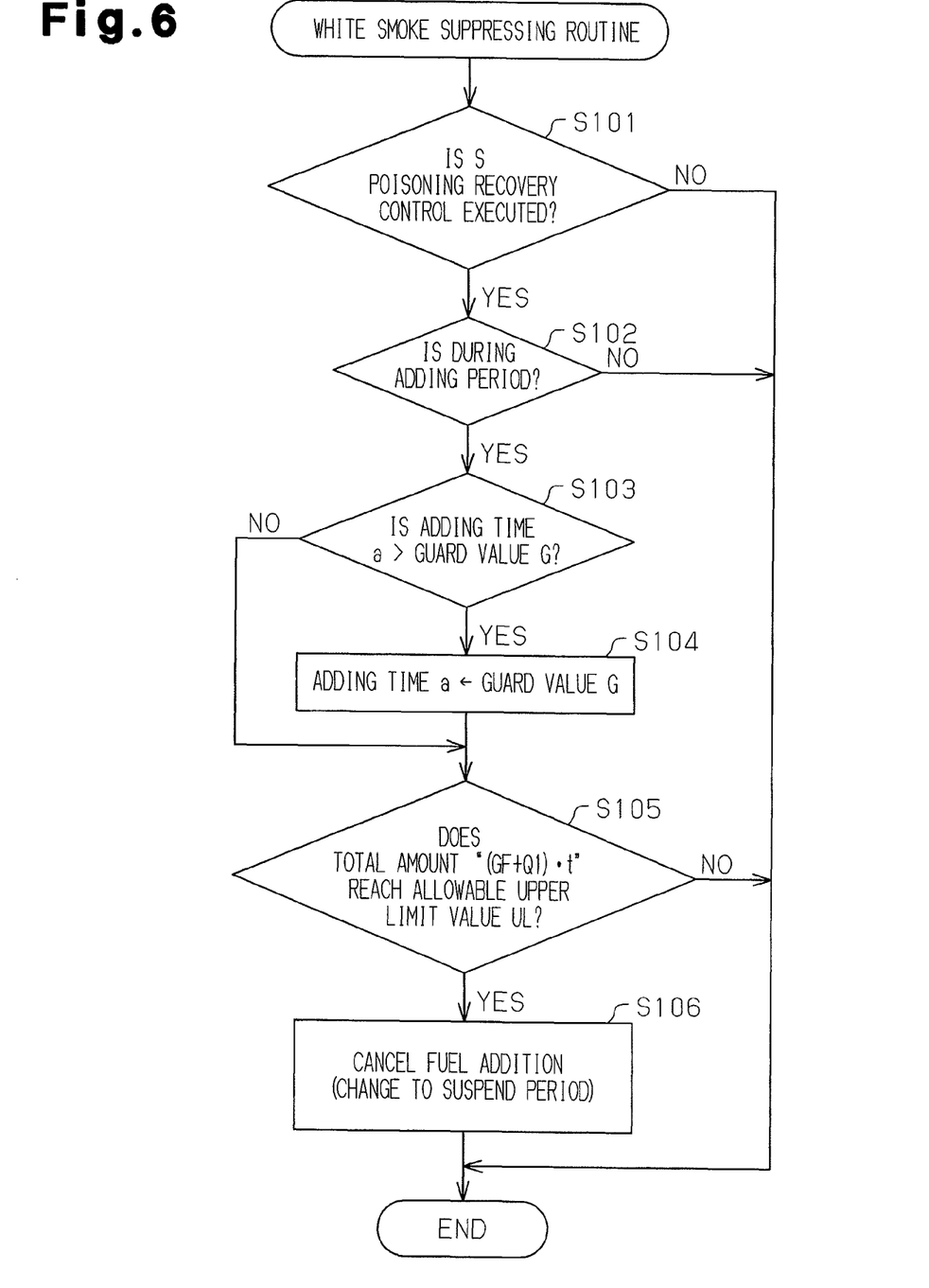
FIG. 6 is a flowchart showing a procedure of executing a limit of one-time adding amount and a limit of a total supplying amount.

FIG. 6 is a flowchart illustrating a white smoke suppressing routine about executing procedures for limiting the one-time adding amount and limiting the total supply amount. The white smoke suppressing routine is periodically executed by the electronic control unit 50, for example, by time interruption per predetermined time.

In the routine, it is determined whether the adding time a is larger than the guard value G (S103) on the condition that the catalyst recovery control is currently executed (YES in S101) and that it is currently in the adding period A (YES in S102). If an affirmative determination is made, the adding time a is set to the value equal to the guard value G (S104). The adding time a is limited to the guard value G or less through this process, and the fuel adding amount per unit time during the adding period A is limited to the allowable upper limit value Q1max or less. As a result, incomplete purification of the unburned fuel component by the NOx catalyst during the adding period A is prevented.

Further, after starting the adding period A, it is determined whether the total amount (GF+Q1)·t of the unburned fuel component supplied to the NOx catalyst reaches the allowable upper limit value UL (S105). If an affirmative determination is made, the concentrated intermittent fuel addition during the adding period A is canceled, and the suspend period B is forcibly started (S106). Accordingly, it is possible to prevent such a great amount of unburned fuel component that cannot be purified by the NOx catalyst from being supplied to the NOx catalyst during the adding period A.

The present embodiment described above has the following advantages.

The adding time a is limited to the guard value G or less in such a manner that the fuel adding amount per unit time becomes equal to or less than the allowable upper limit value Q1max at and below which the unburned fuel component can be fully purified by the NOx catalyst, during the adding period A in the catalyst recovery control, and the one-time adding amount of the fuel from the adding valve 46 is limited to the predetermined value (Q1max·t/N) or less. Accordingly, it is possible to inhibit such a great amount of unburned fuel component that cannot be fully purified by the NOx catalyst from being supplied to the NOx catalyst, and inhibit white smoke generated in the exhaust gas of the internal combustion engine 10, when the concentrated intermittent fuel addition is carried out during the adding period A.

The allowable upper limit value Q1max is set to a value GA/X−GF, as is apparent from the expression (3). The allowable upper limit value Q1max is a value corresponding to a maximum value of the fuel adding amount per unit time at which the NOx catalyst can fully purify the unburned fuel component on the condition that the NOx catalyst is in the deteriorated state. Accordingly, it is possible to set the value Q1max to a suitable value under the condition that the NOx catalyst is in the deteriorated state, in conformity with the changes of the values GA and GF.

If the total amount (GF+Q1) of the unburned fuel component supplied to the NOx catalyst during the adding period A reaches the allowable upper limit value of the total amount at and below which the NOx catalyst can fully purify the unburned fuel component, the concentrated intermittent fuel addition in the adding period A is canceled and the suspend period B is forcibly started. The total amount (GF+Q1)·t corresponds to a value obtained by adding up the total amount (GF·t) sent out to the exhaust passage 14 from the combustion chamber 13 during the adding period A, and the total amount (Q1·t) of the fuel added to the upstream side of the NOx catalyst from the adding valve 46 during the adding period A. Accordingly, it is possible to prevent such a great amount of unburned fuel component that cannot be fully purified by the NOx catalyst from being supplied to the NOx catalyst during the adding period A, and it is possible to inhibit white smoke generated in the exhaust gas in the internal combustion engine 10.

The fuel adding amount Q1 per unit time is used in determining the total amount (GF+Q1)·t. The value Q1 is calculated as a value (QT·N/t) obtained by multiplying the one-time adding amount QT of the fuel in the concentrated intermittent fuel addition during the adding period A by the number of times N of the fuel addition from the start of the adding period A, and dividing the result by the elapsed time T from the start of the adding period A. Accordingly, it is possible to accurately calculate the value Q1. Therefore, it is possible to accurately express the total amount (GF+Q1)·t.

The allowable upper limit value UL is set to a value corresponding to the total amount (GF+Q1)·t at and below which the NOx catalyst can purify the total amount under the condition that the NOx catalyst is in the deteriorated state. Accordingly, by canceling the fuel addition and forcibly starting the suspend period B at a time when the total amount (GF+Q1)·t reaches the allowable upper limit value UL it is possible to prevent the total amount (GF+Q1)·t from becoming so great that it cannot be purified by the NOx catalyst, and prevent white smoke from being generated in the exhaust gas of the internal combustion engine, under the condition that the NOx catalyst is in the deteriorated state.

The total amount of the unburned fuel component which can be fully purified by the NOx catalyst during the adding period A tends to become larger as the intake air flow rate GA increases. In order to set the allowable upper limit value UL to the optimum value in correspondence thereto, the allowable upper limit value UL is set to the larger value as the intake air flow rate GA increases. Therefore, it is possible to set the time at which the fuel addition during the adding period A is cancelled and the suspend period B is forcibly started to a point in time as delayed as possible such that a lot of fuel additions can be carried out without generating white smoke in the exhaust gas in the internal combustion engine 10.

The above embodiment may be modified, for example, as follows.

The allowable upper limit value UL used for limiting the total supply amount mentioned above may be set to a fixed value. In this case, the allowable upper limit value UL may be a value at a time when the intake air flow rate GA becomes minimum.

In the catalyst recovery control, the excessive supply of the unburned fuel component to the NOx catalyst during the adding period A tends to be generated particularly during the S release control in which the fuel adding amount per unit time becomes more. Accordingly, the adding amount limitation may be executed only during the S release control.

In place of the case that both of the adding amount limitation and the fuel adding interruption are carried out, only one of them may be carried out.

In the case that the NOx catalytic converter 25 supporting the NOx catalyst is provided on the upstream side of the PM filter 26, it is not always necessary that the PM filter 26 carries the NOx catalyst.

In the case that the PM filter 26 supports the NOx catalyst, the NOx catalytic converter 25 does not need to be provided.

The invention claimed is:

1. An exhaust gas purification apparatus of an internal combustion engine, the exhaust gas purification apparatus comprising a storage reduction type NOx catalyst provided in an exhaust system of the internal combustion engine, wherein the exhaust gas purification apparatus conducts catalyst recovery control for releasing sulfur oxide stored in the NOx catalyst,
  wherein an adding period for carrying out a continuous intermittent fuel addition to a section upstream of the NOx catalyst of the exhaust system and a suspend period during which the intermittent fuel addition is stopped are repeated in the catalyst recovery control, and
  wherein the intermittent fuel addition is carried out in such a manner that an air-fuel ratio detected by an air-fuel ratio sensor provided in the exhaust system during the adding period comes to a target air-fuel ratio which is richer than a stoichiometric air-fuel ratio,
  wherein the exhaust gas purification apparatus includes a control unit configured to:
  set a fuel adding amount at one time in the intermittent fuel addition during the adding period based on temperature of the exhaust gas;
  limit the fuel adding amount to a predetermined value or less when the fuel adding amount set based on the temperature of the exhaust gas exceeds the predetermined value,
  set the predetermined value such that a fuel adding amount per unit time during the adding period becomes equal to or less than an allowable upper limit value at and below which the NOx catalyst fully purifies an unburned fuel component; and
  set the predetermined value to Q1max·t/N, wherein Q1max denotes the allowable upper limit value, t denotes an elapsed time from the start of the adding period, and N denotes a number of times of the fuel addition to the exhaust system from the start of the adding period.

2. The exhaust gas purification apparatus according to claim 1, wherein the control unit is configured to set the allowable upper limit value Q1max to (GA/X)−GF, wherein GA denotes an intake air flow rate of the internal combustion engine, GF denotes a flow rate of the unburned fuel component sent out to the exhaust system from the combustion chamber of the internal combustion engine, and X denotes an upper limit value of an exhaust gas air-fuel ratio at and below which the unburned fuel component can be fully purified under a condition that the NOx catalyst is in a thermally deteriorated state.

3. An exhaust gas purification apparatus of an internal combustion engine, the exhaust gas purification apparatus comprising a storage reduction type NOx catalyst provided in an exhaust system of the internal combustion engine,
wherein the exhaust gas purification apparatus conducts catalyst recovery control for releasing sulfur oxide stored in the NOx catalyst and accordingly an adding period for carrying out a continuous intermittent fuel addition to a section upstream of the NOx catalyst of the exhaust system and a suspend period during which the intermittent fuel addition is stopped are repeated in the catalyst recovery control, and wherein the intermittent fuel addition is carried out in such a manner that an air-fuel ratio detected by an air-fuel ratio sensor provided in the exhaust system during the adding period comes to a target air-fuel ratio which is richer than a stoichiometric air-fuel ratio,
wherein the exhaust gas purification apparatus includes a control unit configured to:
calculate a total amount of the unburned fuel component supplied to the NOx catalyst during the adding period, and that cancels the intermittent fuel addition so as to forcibly shift the adding period to the suspend period at a time when the total amount of the unburned fuel component reaches a predetermined value,
set the predetermined value to an allowable upper limit value at and below which the NOx catalyst fully purifies an unburned fuel component; and
calculate the total amount of the unburned fuel component supplied to the NOx catalyst during the adding period as an expression $(GF+Q1) \cdot t$, wherein GF denotes a flow rate of the unburned fuel component sent out to the exhaust system form the combustion chamber of the internal combustion engine, Q1 denotes a fuel adding amount per unit time during the adding period, and t denotes an elapsed time from the start of the adding period.

4. The exhaust gas purification apparatus according to claim 3, wherein the control unit is configured to calculate the fuel adding amount per unit time as an expression $Qt \cdot N/t$, wherein N denotes a number of times of the fuel addition to the exhaust system from the start of the adding period, and Qt denotes a one-time fuel adding amount in the intermittent fuel addition.

5. An exhaust gas purification apparatus of an internal combustion engine, the exhaust gas purification apparatus comprising a storage reduction type NOx catalyst provided in an exhaust system of the internal combustion engine,
wherein the exhaust gas purification apparatus conducts catalyst recovery control for releasing sulfur oxide stored in the NOx catalyst and accordingly an adding period for carrying out a continuous intermittent fuel addition to a section upstream of the NOx catalyst of the exhaust system and a suspend period during which the intermittent fuel addition is stopped are repeated in the catalyst recovery control, and wherein the intermittent fuel addition is carried out in such a manner that an air-fuel ratio detected by an air-fuel ratio sensor provided in the exhaust system during the adding period comes to a target air-fuel ratio which is richer than a stoichiometric air-fuel ratio,
wherein the exhaust gas purification apparatus includes a control unit configured to:
calculate a total amount of the unburned fuel component supplied to the NOx catalyst during the adding period, and that cancels the intermittent fuel addition so as to forcibly shift the adding period to the suspend period at a time when the total amount of the unburned fuel component reaches a predetermined value, and
set the predetermined value to an allowable upper limit value at and below which the NOx catalyst fully purifies an unburned fuel component, wherein is set the predetermined value to an allowable upper limit value at and below which the unburned fuel component can be fully purified under a condition that the NOx catalyst is in a thermally deteriorated state.

6. An exhaust gas purification apparatus of an internal combustion engine, the exhaust gas purification apparatus comprising a storage reduction type NOx catalyst provided in an exhaust system of the internal combustion engine,
wherein the exhaust gas purification apparatus conducts catalyst recovery control for releasing sulfur oxide stored in the NOx catalyst and accordingly an adding period for carrying out a continuous intermittent fuel addition to a section upstream of the NOx catalyst of the exhaust system and a suspend period during which the intermittent fuel addition is stopped are repeated in the catalyst recovery control, and wherein the intermittent fuel addition is carried out in such a manner that an air-fuel ratio detected by an air-fuel ratio sensor provided in the exhaust system during the adding period comes to a target air-fuel ratio which is richer than a stoichiometric air-fuel ratio,
wherein the exhaust gas purification apparatus includes a control unit configured to:
calculate a total amount of the unburned fuel component supplied to the NOx catalyst during the adding period, and that cancels the intermittent fuel addition so as to forcibly shift the adding period to the suspend period at a time when the total amount of the unburned fuel component reaches a predetermined value,
set the predetermined value to an allowable upper limit value at and below which the NOx catalyst fully purifies an unburned fuel component; and
set the allowable upper limit value to a larger value as an intake air flow rate of the internal combustion engine becomes larger.

* * * * *